United States Patent [19]

Penney et al.

[11] Patent Number: 4,645,917
[45] Date of Patent: Feb. 24, 1987

[54] SWEPT APERTURE FLYING SPOT PROFILER

[75] Inventors: Carl M. Penney, Schenectady, N.Y.; Robert N. Roy; Bradley S. Thomas, both of Altamonte Springs, Fla.

[73] Assignee: General Electric Company, Schenectady, N.Y.

[21] Appl. No.: 739,632

[22] Filed: May 31, 1985

[51] Int. Cl.$^4$ .................. G01B 11/00; G01C 3/20
[52] U.S. Cl. .................. 250/201; 250/560; 356/1; 356/376; 364/556
[58] Field of Search .......... 250/201 R, 560; 356/1, 356/4, 376, 377; 364/556, 559–561

[56] References Cited

U.S. PATENT DOCUMENTS

| 3,757,125 | 9/1973 | Okada et al. | 250/202 |
| 3,782,827 | 1/1974 | Nisenson et al. | 356/120 |
| 4,146,926 | 3/1979 | Clerget et al. | 356/376 |
| 4,158,507 | 6/1979 | Himmel | 356/376 |
| 4,311,384 | 6/1982 | Keene | 356/152 |
| 4,336,997 | 6/1982 | Ross et al. | 356/4 |
| 4,349,277 | 9/1982 | Mundy et al. | 356/376 |
| 4,355,904 | 10/1982 | Balasubramanian | 356/376 |
| 4,484,069 | 11/1984 | Brenholdt | 250/201 |

Primary Examiner—Edward P. Westin
Attorney, Agent, or Firm—Paul R. Webb, II; James C. Davis, Jr.

[57] ABSTRACT

A flying spot system uses a laser beam scanned in X and Y directions to provide surface profile information. The beam is applied to a surface under test and the time interval between the beginning of the sweep and the appearance of the beam image through an aperture is determined. This time interval is indicative of the beam angle which, through optical triangulation, is used to determine the surface height. A scan-descan arrangement and a plate with a small aperture are used to isolate a light detector from background light.

25 Claims, 6 Drawing Figures

SWEPT APERTURE FLYING SPOT PROFILER

BACKGROUND OF THE INVENTION

This invention relates to a surface profiler, more particularly a surface profiler using a "flying spot".

The use of various kinds of industrial vision systems has become quite widespread. Such systems find common application in robotic systems, such as robotic welding systems wherein the industrial vision systems or devices are used to control a welding head such that it follows a weld seam. Industrial vision systems are used for numerous other applications such as generating data on the profile of a surface, which data can be conveniently stored electronically. Such industrial vision sensors have included systems using TV cameras, linear detector arrays, and flying spot camera systems using lasers.

Although impressive improvements have been made in vision sensors using TV cameras, a number of disadvantages remain. In particular, the sensitivity, dynamic range, and background light rejection capabilities of TV cameras have posed significant limitations on their use for industrial vision sensing. Considering that the directional reflectivity of angled metal surfaces with typical industrial finishes can easily vary over factors of several thousand, the dynamic range on the order of several hundred to one of standard TV camera detector systems will be greatly exceeded. Additionally, the limited sensitivity of TV cameras typically requires a relatively high power laser which must be carefully controlled to avoid posing safety hazards.

Various structured light profile determination systems can be used to generate a pattern of different wavelength light to be applied to a surface. For example, by sensing the reflected light from the pattern by use of two detector arrays (one for each of the two light wavelengths), one can develop a profile mapping of the surface. U.S. Pat. No. 4,349,271 issued on Sept. 14, 1982 to Joseph L. Mundy, Gilbert B. Porter III, and Thomas M. Cipolla, entitled "NON-CONTACT MEASUREMENT OF SURFACE PROFILE", and assigned to the assignee of the subject invention, discloses such a structured light profile determination system.

Although such structured light profile determination systems using arrays are generally useful, they are subject to several disadvantages. In particular, the resolution of such systems is limited by the density of the detector elements in the detector array. Additionally, the requirement for a large number of detector elements to provide reasonable resolution and a sufficient field of view tends to limit the quality of the detector element which may be used. That is, a detector element such as a photomultiplier tube which is highly sensitive and has a relatively good dynamic range is too expensive for use in an array for many structured light applications. On the other hand, a detector element such as a photodiode which is less expensive can be used to realize a relatively low priced array, but lacks the sensitivity and dynamic range of a photomultiplier tube.

Prior art flying spot profile measuring systems have typically used a laser beam which is scanned onto a surface. The image of the beam hitting the surface is tracked by a detector array which is offset from the angle at which the beam is directed to the surface. Using optical triangulation techniques, knowledge of the angle at which the beam strikes the surface and of the position of the beam's image on the surface allows determination of the surface profile. Because such systems have generally used detector arrays, such systems are also subject to sensitivity, dynamic range, and resolution limitations found in the detector arrays used in structured light systems. Additionally, the variations in surface directional reflectivity may require the use of a relatively powerful laser necessitating various special safety precautions which are economically disadvantageous and operationally cumbersome.

Another form of profile measuring system, described in U.S. Pat. No. 4,158,507 employs a laser beam which is scanned across a surface and has its image detected by a single photomultiplier tube. In order to trace the path of the scanned beam across the surface, an optical grating is disposed between the image of the beam and the photomultiplier. As the beam sweeps across the surface, the sweep time between various transparent strips on the grating is indicative of the slope of the surface. Such a system suffers from limited resolution. In particular, if the grating is quite fine (very narrow alternating transparent and opaque strips), the system will be able to detect small variations in surface slope. However, such very narrow grating strips could produce erroneous or misleading detection patterns. Specifically, if there is a sharp surface change or major vertical step in the surface, a beam's image may jump over more than one strip of the grating such that the detection system produces an erroneous indication of the height of that step.

A flying spot profiler using only two sensors is disclosed in co-pending U.S. patent application Ser. No. 714,416 of C. Murray Penney, filed Mar. 21, 1985 entitled "METHOD AND SYSTEM FOR DETERMINING SURFACE PROFILE INFORMATION", assigned to the assignee of the present application and hereby incorporated by reference. That invention uses a feedback arrangement to vary the angle at which a laser beam is applied to the surface under test such that the image of the beam on the surface tends to be maintained constant with respect to a linear reference position. The variations in the angle of application of the laser beam is indicative of the surface height. The arrangement avoids the position uncertainty present in the above-noted optical grating profiler.

OBJECT OF THE INVENTION

It is a primary object of the present invention to provide a new and improved system and method for determining profile information.

A more specific object of the present invention is to provide profile determination with a high degree of sensitivity.

Yet another object of the present invention is to provide surface profile determination with a high degree of rejection of background light.

A still further object of the present invention is to provide surface profile determination with a high degree of resolution.

Yet another object of the present invention is to provide surface profile determination in a relatively simple and economic manner.

SUMMARY OF THE INVENTION

The above and other objects of the present invention which will become apparent as the description proceeds, are realized by a system having an optical beam source, such as a laser, which generates an optical beam for application to a surface for which profile information such as height or range is desired. An X-scanner is operable under the control of a scan drive signal to sweep the beam across the surface in an X-direction. A sensor senses reflected optical energy corresponding to an image of the beam hitting the surface and provides a sensor output. An optical shield shields the sensor, but allows passage of the reflected optical energy through an aperture in the shield. A subsystem for measurement and control is used to time the interval between a reference mark in the scan drive signal and the appearance of the beam image in the aperture. The appearance of the beam image in the aperture occurs once for each X-direction sweep and generates a pulse from the sensor. The timing of this pulse relative to the reference mark is used to determine the profile information (i.e., range or Z-dimension) by optical triangulation. This time interval corresponds to a readily calculated beam angle.

A simplified version of the present invention may provide the height (i.e., range) of a single point on a surface by virtue of the X-direction scanning.

A more sophisticated embodiment of the present invention also uses Y-direction scanning so as to provide a profile of the surface (i.e., a table of Z-values, one for each Y-value). The Y-direction scanning is accomplished by a scanning-descanning mirror which descans reflected optical energy from the surface such that it is independent of the Y-direction variations of the optical energy applied to the surface.

The measuring and control subsystem includes a location latch circuit and a peak detector. The location latch circuit latches to the value of the scan drive signal when the peak detector detects a maximum output for the sensor for a particular sweep of the beam. The location latch circuit provides a single image location output for each sweep of the beam, the image location output being indicative of the surface height.

As the aperture typically views less than 0.1% of the total field of view, the optical shield provides excellent background light rejection for the sensor. In preferred embodiments, the sensor can be either a photomultiplier or an avalanche diode, either of which is orders of magnitude more sensitive than solid state diodes with their associated amplifiers.

BRIEF DESCRIPTION OF THE DRAWINGS

The above and other features of the present invention will be more readily apparent when the following detailed description of a preferred embodiment is considered in conjunction with the accompanying drawings wherein like characters represent like parts throughout and in which.

DETAILED DESCRIPTION OF THE INVENTION

Figure 1:
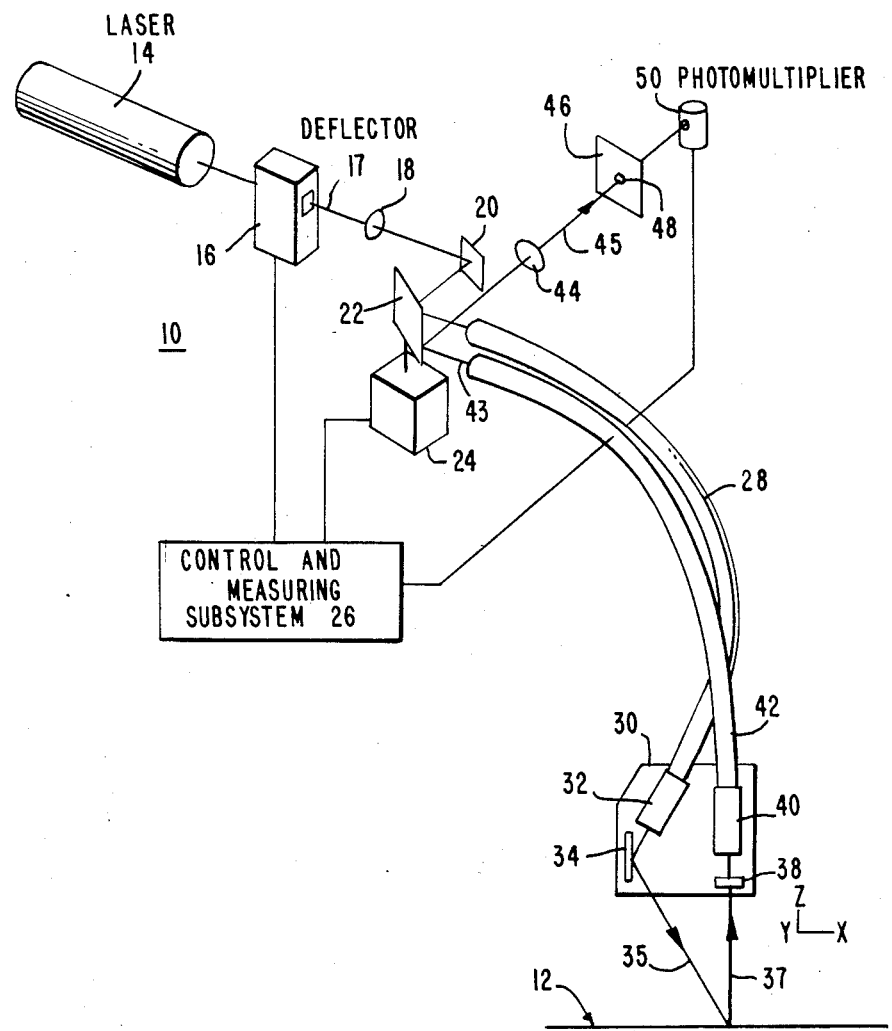
FIG. 1 shows a schematic with parts in perspective of the system of the present invention.

With reference now to FIG. 1, the system 10 of the preferred embodiment of the present invention will be described. The system 10 may be used to determine surface profile information from a surface 12 which is under test. Such surface profile information would preferably be the height of the surface, which height may be defined with reference to other portions of the surface 12 and/or defined with reference to the range between the system 10 and the surface 12.

The system 10 of the present invention includes a laser 14 outputting a beam for passage through an acousto-optic deflector 16 which serves as an X-scanner. The X-scanned output beam 17 of deflector 16 is supplied to a lens 18 and reflected by a mirror 20 to a Y-scanner mirror 22 controlled by galvanometer 24.

The optical beam reflected by scanning mirror 22 is fed into one end of a coherent fiber optic bundle 28 for passage to an optical head 30 disposed at the other end. The use of a separate head coupled to a support box by fiber optics is not an essential feature of the present invention, but will provide advantageous protection and miniaturization to many applications. The optical head 30, which is illustrated schematically, includes a lens 32 to receive light from the fiber optic bundle 28 and apply the light to mirror 34 such that it is reflected as beam 35 directed to the surface 12. The directed beam 35 may be scanned in the X and Y directions respectively by operation of the X-scanner deflector 16 and the Y-scanning mirror 22.

The reflected optical energy corresponding to the image of beam 35 upon surface 12 is reflected beam 37 which passes through filter 38. The filter 38 may serve to filter out background light which is not within the spectral range corresponding to the light output by the laser 14. The filtered reflection beam passes from filter 38 into lens 40 and one end of coherent fiber optic bundle 42. The output of the fiber optic bundle 42 is beam 43 which is outputted from the other end of optic bundle 42 and directed to the scanning mirror 22 for descanning. That is, the Y-scanning mirror 22 introduces a Y-scanning in the optical beam prior to its contact with surface 12 and, by virtue of the arrangement shown, allows the reflected optical energy or beam image to be independent of the Y-direction variations. This descanned beam is passed through lens 44 to become beam 45. The beam 45 is applied to an optical shield plate 46 having an aperture 48. When the beam 45 is lined up with the aperture 48, the beam 45 passes through the aperture 48 and is applied to a photomultiplier 50. The photomultiplier 50 is a preferred sensor because of its high sensitivity and dynamic range, but it will be understood that other optical sensors could be used. Plate 46 is illustrated schematically and, in actual practice, the plate or shield 46 prevents light from reaching the photomultiplier 50 except light which has passed through the aperture 48. The aperture 48 is preferably a circular hole or slit viewing only a small fraction of the scanned field. Because the beam 45 has been descanned with respect to its Y variations, its time integrated image is a stationary straight line image on the plate 46 corresponding to the X scans of the beam 45. For the illustrated arrangement of FIG. 1, this line image would extend above and below the aperture 48, which aperture would be placed near the middle of the line image location when the observed or measured surface 12 is at the middle of the range over which it can be observed.

A control and measuring subsystem 26 is electrically connected to the X-scanner deflector 16, galvanometer 24, and photomultiplier 50 as illustrated in FIG. 1. For ease of illustration, each of the electrical connection lines are shown as a single line, but a plurality of connecting wires may be used as necessary.

Figure 2:
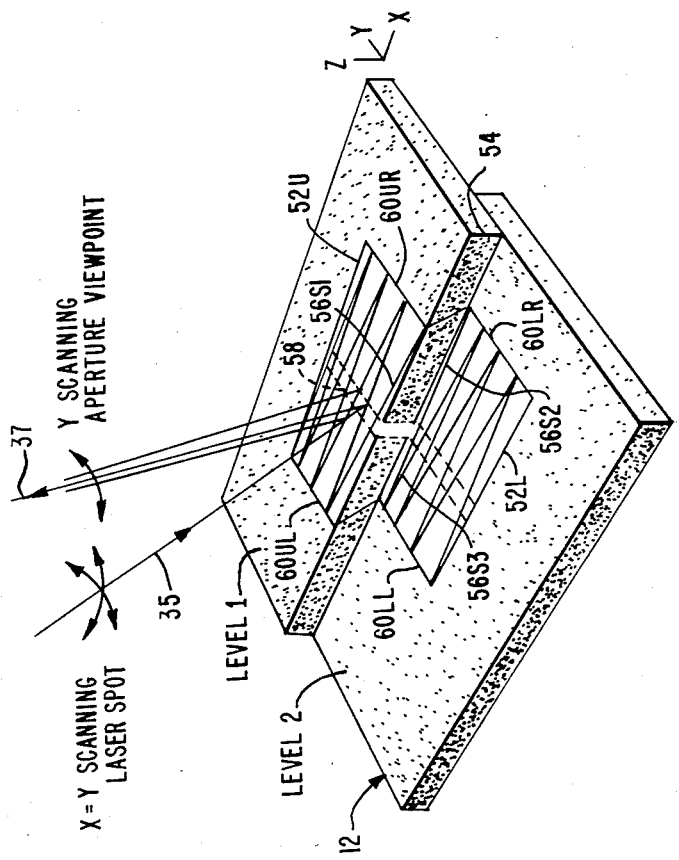
FIG. 2 shows a perspective of a sweep pattern established by the present invention upon a test surface.
Figure 3:
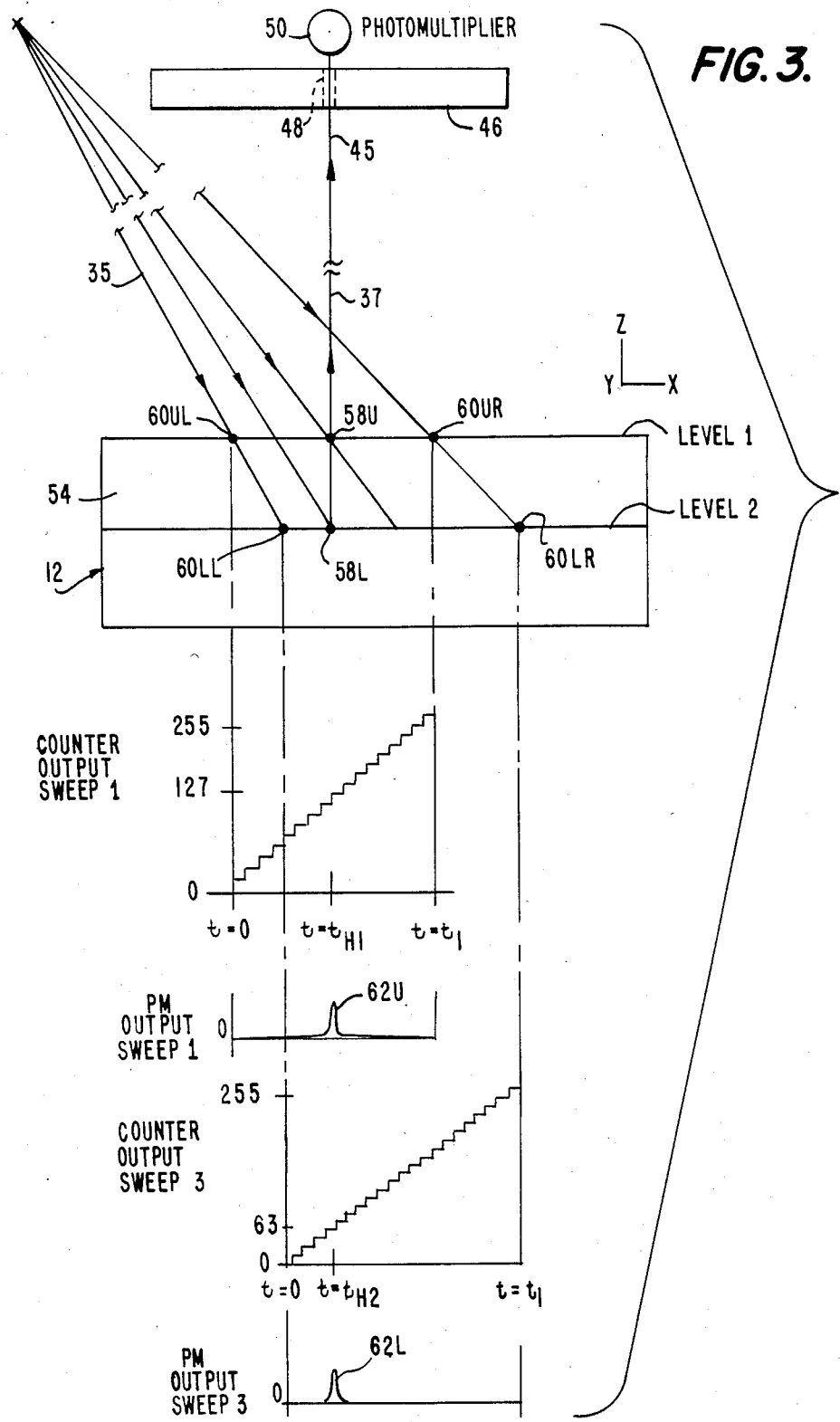
FIG. 3 shows a side view of the pattern of FIG. 2 together with a schematic representation of some parts of the present invention and including timing charts illustrating the operation of the present invention.

With reference now to FIGS. 2 and 3, the scattering pattern of the laser spot or direct optical beam 35 will be explained. FIG. 2 shows a perspective view of a particular test surface 12, whereas FIG. 3 shows a front view of the test surface schematically illustrating its relationship with the aperture plate 46 and photomultiplier 50 and including various related timing charts discussed in detail below.

The particular test surface 12 includes a surface level 1 separated from a surface level 2 by an edge or step 54. The beam 35 is scanned in both X and Y to generate a sweep pattern of zig-zags which would be enclosed within upper and lower pattern rectangles 52U and 52L respectively. The rectangles of 52U and 52L are shown for illustrative purposes to illustrate the outer edge of the sweep patterns, it being understood that the directed beam 35 is repeatedly swept back and forth to realize sweeps such as 56S1, 56S2, and 56S3 which may be arbitrarily referred to as sweep 1, sweep 2, and sweep 3 respectively. The upper left boundary of rectangle 52U is an imaginary line 60UL, whereas the upper right boundary of rectangle 52U is an imaginary line 60UL. Similar lower left and lower right imaginary lines 60LL and 60LR serve as the left and right respective boundaries of the lower pattern rectangle 52L.

An aperture view stripe 58 is shown in dashed lines in FIG. 2, whereas a point 58U on the upper (i.e., level 1) portion of view stripe 58 and a point 58L on the lower (i.e., level 2) portion of view stripe 58L are shown in FIG. 3. As illustrated schematically with respect to FIG. 3, at any particular time the aperture 48 allows photomultiplier 50 to "see" only one point on the view stripe, such as point 58U. Because the reflected beam 37 is descanned to realize beam 45 (FIG. 1), over a Y-scan period the aperture 48 samples each point in the stripe 58. The descanning and other mirrors, lenses, and fiber optics bundles have been deleted from FIG. 3 to more clearly illustrate the principles of operation of the present invention.

The principle of operation is best illustrated in the top portion of FIG. 3. The directed beam 35 is shown in various positions corresponding to its sweep in the X-direction. When the beam 35 is swept back and forth across the upper level 1, the beam 35 sweeps between 60UL and 60UR. However, the photomultiplier 50 will "see" the reflected image only when the beam 35 falls upon points in the view stripe 58 (FIG. 2) such as point 58U (FIG. 3). The image of the directed beam 35 would be swept between lines 60LL and 60LR when the beam 35 is directed to level 2. Because the directed beam 35 is applied at an angle offset with respect to the Z-direction, the lower left boundary line 60LL is offset in the X-direction with respect to the upper left boundary 60UL and, likewise, boundary line 60LR is offset with respect to 60UR. However, the photomultiplier 50 is viewing in the Z-direction such that the view stripe 58 (FIG. 2) is not offset in the X-direction. Accordingly, the photomultiplier 50 "sees" the diffuse reflection of the beam 35 when it is applied at points such as point 58L in the view stripe. By sensing the time interval for the directed beam to move from 60UL (or 60UR) to the point 58U and which its image is "seen" by photomultiplier 50, one can determine the height (i.e., range from the system) of the surface 12. The time interval between the sweep boundary 60LL and the appearance of the image through aperture 48 corresponding to beam 35 being applied at or immediately adjacent point 58L would be indicative of the height of level 2 of the surface 12.

It should be appreciated that the width of the view stripe 58 may be quite narrow depending upon the size of aperture 48. Typically, its dimension in the X direction can be chosen to be about 1% of the image width of the X-scan. The Y dimension can be equal, yielding a round or square aperture, or somewhat larger to facilitate alignment, yielding a slit-shaped aperture. Typically, the aperture's X-dimension might be 100 microns and preferably would be less than 500 microns. Depending upon the relative sweep rates in the X and Y directions as determined by the X-scanner 16 and the Y-scanning mirror 22, the zig-zag pattern of FIG. 2 may be compressed such that each sweep of the beam 35 is quite close to the previous sweep. Preferably, the X-direction sweeping is at a relatively high frequency such as 5–50 kilohertz, whereas the Y-scanning is at a lower frequency such as 15 to 30 hertz. Such a dual scan would produce a rectangular illuminated area which would appear to the human eye continuously and uniformly illuminated because of the scan rapidity.

Before proceeding to discuss the timing charts of FIG. 3 in conjunction with the circuit details of FIGS. 5A and 5B, the simplified embodiment of the present invention will be discussed with reference to FIG. 4. The system 110 of FIG. 4 includes numerous components which are identical or substantially identical to corresponding components in the FIG. 1 embodiment. Accordingly, the components of FIG. 4 have been labeled in the 100 Series with the same last two digits as the corresponding component of the FIG. 1 embodiment. Emphasis herein will be on the differences between the FIG. 4 embodiment and the FIG. 1 embodiment.

The laser 114 supplies an optical beam to an X-scanner acousto-optic deflector 116. In turn, the deflector 116 supplies a scanned beam 117 to a coherent fiber optic bundle 128 by way of lens 118. The bundle 128 extends to the schematically illustrated optical head 130 and transmits the beam to a lens 134. The output of the lens 134 is the directed beam 135 which is swept in an X-direction on the surface 112. The reflected beam 137 is fed to a lens 138 and to an apertured plate 146 having aperture 148. The plate or optical shield 146 allows only the light which has passed through the aperture 148 to enter into a fiber optic bundle 142. Because the aperture plate 146 is prior to the bundle 142 in the FIG. 4 embodiment, the fiber optic bundle 142 may be an incoherent fiber optic bundle (instead of a more expensive coherent fiber optic bundle). The output of the fiber optic bundle 142 is supplied to photomultiplier 150 by way of lens 144. The photomultiplier 150, or other optical sensor which might be used, would be shielded such that only the light from the optical cable 142 would be sensed by it. A measuring and control subsystem 126 would receive the sensor output of the photomultiplier 150 and would control the deflector 116 by way of electrical control lines.

Figure 4:
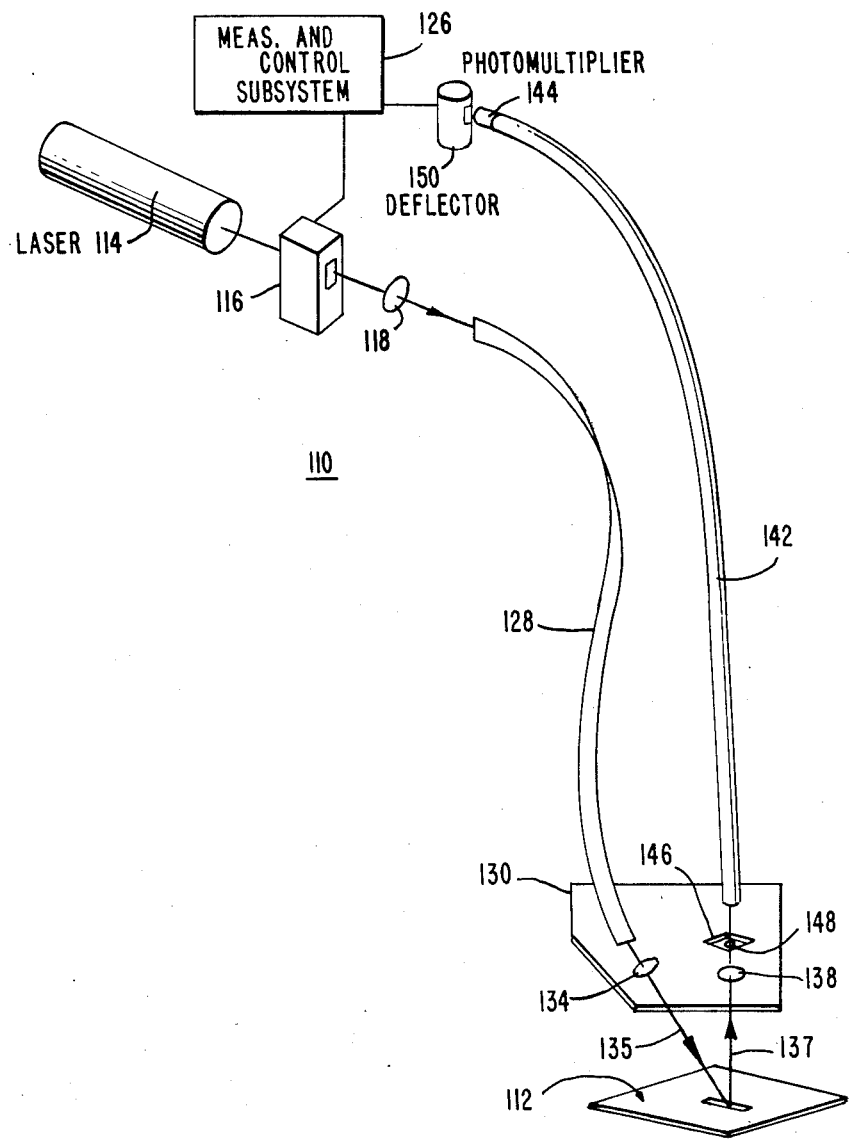
FIG. 4 shows a schematic illustration of a simplified embodiment of the present invention.

The basic principle of operation of the FIG. 4 embodiment is the same as the FIG. 1 embodiment except that there is no Y scanning and, hence, no Y descanning is required. The system 110 determines the height (i.e., range) of the single point (i.e., a small circular viewing area) disposed directly below the aperture 148.

Figure 5A:
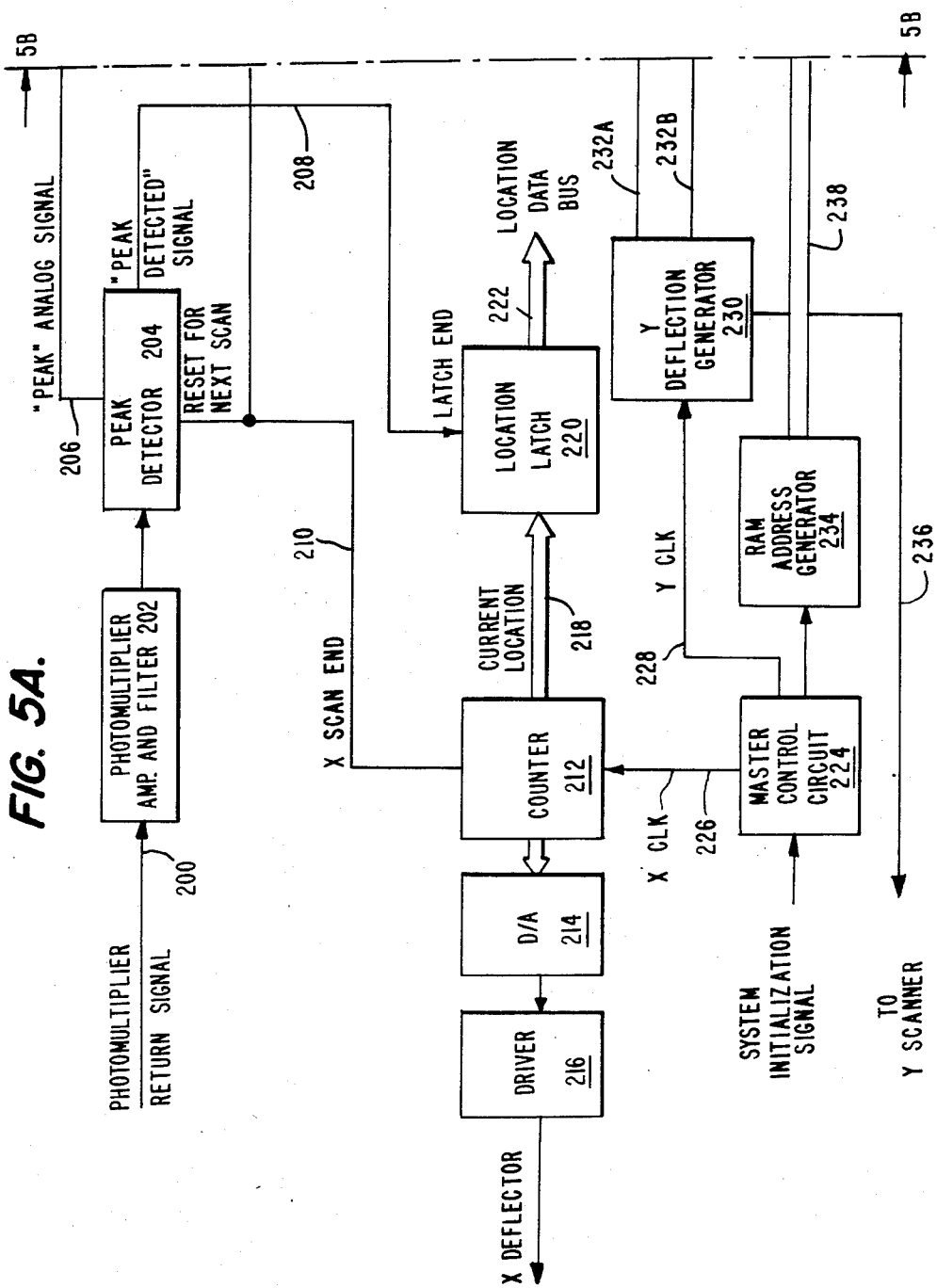
FIGS. 5A and 5B together illustrate the measuring and control subsystem of the present invention.
Figure 5B:
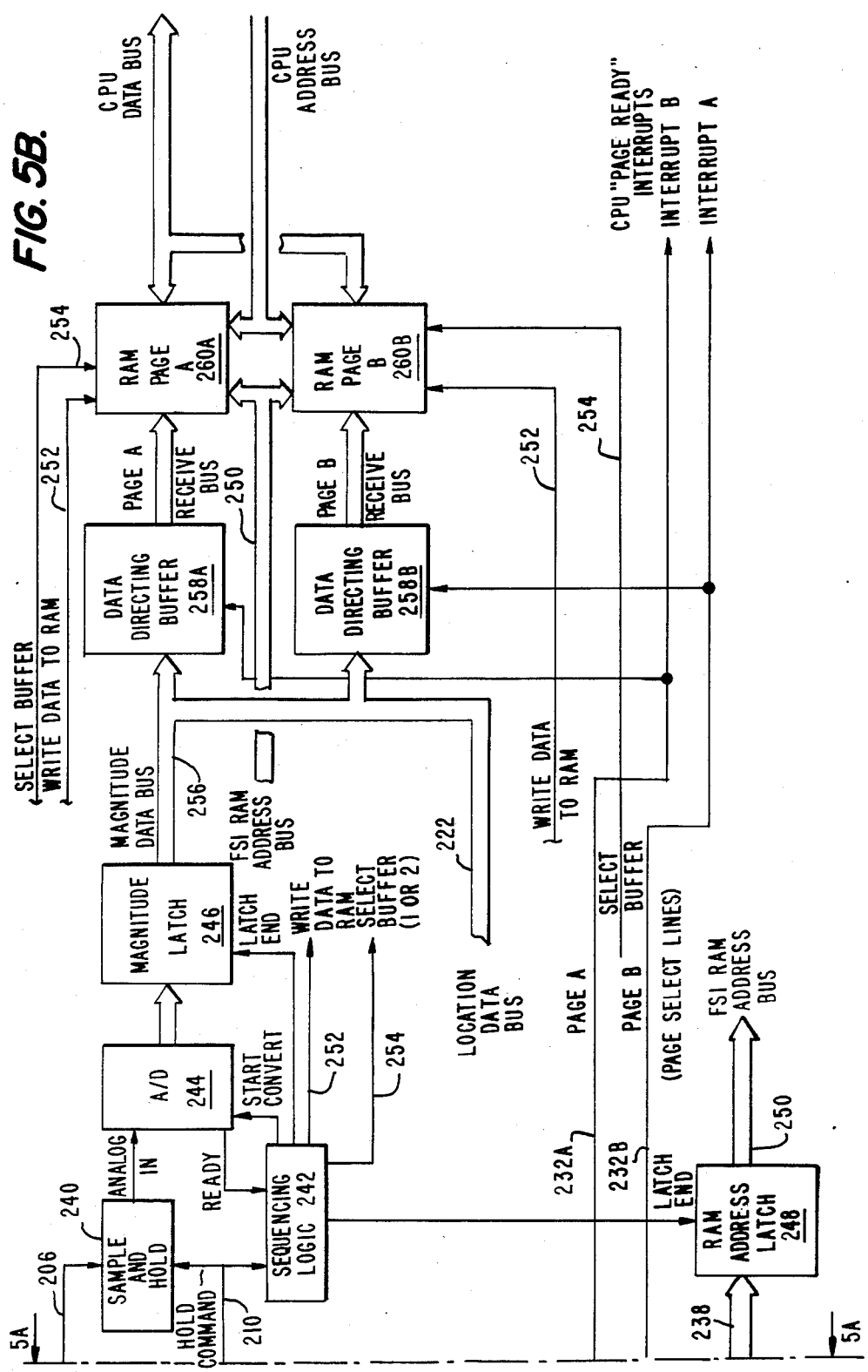

With reference now to FIGS. 5A and 5B, the details of the control and measuring subsystem 26 of FIG. 1 will be discussed in detail. FIGS. 5A and 5B connect together to illustrate the control and measuring subsystem 26.

Line 200 carries a photomultiplier return signal or sensed output of the photomultiplier 50 (FIG. 1) to a photomultiplier amplifier and filter 202, the output of which is fed into a peak detector 204. The peak detector 204 supplies a "peak" analog signal and a "peak detected" digital signal respectively on lines 206 and 208. The "peak" analog signal will be the highest value of the analog signal supplied to peak detector 204 from the amplifier and filter circuit 202 following the most recent reset applied to peak detector 204 on line 210. The "peak detected" signal on line 208 indicates if the current input to peak detector 204 is higher than the stored analog signal. The peak detector 204 is a known circuit which may be realized by a combination of a sample and hold circuit and a comparator circuit.

A system initialization signal causing the start of operation may be supplied to a master control circuit 224, which control circuit generates an X clock on line 226 and a Y clock on line 228. The X clock is fed to an up-down counter 212. The output of counter 212 is fed to a digital-to-analog converter 214 which in turn supplies its output to a acousto-optic driver circuit 216. The output of the counter 212 may be considered as a digital X-scan drive signal, which signal is converted into a triangular wave analog scan drive signal by the digital-to-analog converter 214. The analog scan drive signal in turn is converted into a high frequency scan drive signal by the acousto-optic driver circuit 216. Driver 216 may, for example, be a voltage controlled oscillator to supply oscillations of the appropriate frequency to control the X deflector 16 (shown in FIG. 1 only). In addition to being fed to the digital-to-analog converter 214, the count within counter 212 is fed on line 218 as a current location input to a location latch 220. The latch 220 serves as a location storage circuit. Additionally, the counter 212 supplies an X scan end signal on line 210 which signal resets the peak detector 204 at the end of each X sweep. The location latch 220 supplies an output on location data bus 222. The output on lines 222 at the end of each X-direction sweep will be an image location output corresponding to the time interval between a beginning of the sweep and the appearance of the beam image as sensed by the photomultiplier 50 of FIG. 1.

The Y clock fed on line 228 controls a Y deflection generator 230 which is connected to the Y scanning galvanometer 24 (FIG. 1) by the control line 236 supplying appropriate Y scan drive signals. The Y deflection generator 230 also may supply page A and page B select lines 232A and 232B respectively. These lines are used to select which of two random access memory pages receives data.

A random access memory address generator 234 receives a clock from master clock circuit 224 and generates appropriate memory addresses on bus 238 which is supplied to a RAM address latch 248. The RAM address latch 248 supplies a FSI RAM address bus 250 with an address used to access RAM pages A and B 268A and 268B respectively. To avoid overcrowding of the Figures and overlapping of lines, it will be noted that the FSI RAM address bus 250 and several other buses and control lines are shown in more than one part.

Line 206 extends from the peak detector to a sample and hold circuit 240 having its hold command supplied by the X scan end signal on line 210, this line 210 also extending to a sequencing logic circuit 242. The sequencing logic circuit 242 controls the writing of data into the RAM by line 252 and selects one of the buffers by line 254. Additionally, logic circuit 242 supplies a "start convert" signal to an analog-to-digital converter 244, which supplies a ready signal to the sequencing logic circuit 242. The analog-to-digital converter 244 receives an analog in signal from the sample and hold circuit 240 and supplies an output to the magnitude latch 246. The magnitude latch 246 which is controlled by the "latch end" signal from sequencing logic 242, supplies a magnitude output on magnitude data bus 256 which is supplied to two data directing buffers 258A and 258B. These buffers 258A and 258B also receive the image location output on location data bus 222. The output of the data directing buffers 258A and 258B are fed respectively into RAM pages 260A and 260B by the illustrated page A and page B receive buses. The address at which data is read into the RAM pages 260A and 260B depends on the signal on FSI RAM address bus 250.

As shown, the RAM pages 260A and 260B are also connected with a CPU data bus and CPU address bus. This may be used to access the stored information by computer in well-known fashion. The page A and page B select lines 232A and 232B may also be used as interrupts for the CPU.

Operation

With reference now to FIGS. 1, 2, 5A, 5B, and especially FIG. 3 including its timing charts, the operation of the present invention will be discussed in detail.

Upon receipt of the system initialization signal, the master control circuit 224 (FIG. 5A) begins supplying the appropriate clocks to the counter 212, Y deflection generator 230, and RAM address generator 234. The counter 212, digital-to-analog converter 214, and acousto-optic driver 216 together comprise an X scan driver circuit or deflection generator causing the flying spot or laser beam 35 to sweep back and forth in the zig-zag pattern shown in FIG. 2, the Y-scanning mirror 22 causing the beam 35 to move from the back (i.e., upper rectangular pattern 52U in FIG. 2) towards the front (lower rectangular pattern 52L).

With special reference to the sweeps 56S1, 56S2, and 56S3 (FIG. 2) and the timing charts of FIG. 3, the operation of the circuits of FIGS. 5A and 5B will be discussed. As the counter 212 counts between 0 and 255 for the sweep 56S1, which will arbitrarily be referred to as sweep 1 or the first sweep, the flying spot or directed beam 35 will move between boundary line 60UL and boundary line 60UR to realize the first sweep 56S1. The digital scan drive signal output by the counter for sweep 1 is shown in the upper timing chart of FIG. 3, the time running between 0 and an end of sweep time $t_1$.

During the first sweep 56S1, the photomultiplier is providing a sensor output or photomultiplier return signal to the amplifier and filter 202, the output of which is fed into the peak detector 204. The peak detector 204 determines whether its input signal is higher than any previous input during the particular sweep. If the input to the peak detector 204 is a maximum up to the present point in the particular sweep, the "peak detected" signal on line 208 causes the location latch 220 to latch to its current location. Thus, the "peak detected" signal constitutes a store input causing the location storage circuit or latch 220 to latch to the location input or current location signal on line 218 corresponding to the location of the beam for the maximum output of the photomultiplier. For first sweep 56S1, the photomultiplier (PM) output has a peak 62U corresponding to the directed beam 35 falling on point 58U such that it may be "seen" by photomultiplier 50. This corresponds to the time $t_{h1}$ counter output having a count of 127 or being midway in its range. Accordingly, at the end of sweep 1 the location latch will provide an output of 127, this output being an image location output corresponding to the time interval from a reference mark in the digital scan drive signal, in this case at t=0. When the output of counter 212 has reached its end of scan, at t=255, it outputs an X scan end signal on line 212 which resets the peak detector 204. Additionally, the X scan end signal on line 210 is supplied as the hold command to the sample and hold circuit 240, which circuit stores the analog value of the peak signal which appears on line 206. The X scan end signal is also fed into sequencing logic 242. The location latch circuit 220 now holds the value 127 indicating the time interval between the beginning of the sweep at 60UL (FIG. 3) and its appearance to the photomultiplier 50 at point 58U. The sequencing logic 242 operates the analog-to-digital converter 242 which feeds a digital value representative of this maximum photomultiplier output into the magnitude latch 246. The location and magnitude may then be fed into the appropriate RAM page either 260A or 260B depending upon the page select lines 232A and 232B. The writing sequence is controlled by sequencing logic circuit 242 by way of lines 252 and 254.

The location data which has been stored in the RAM should then correspond to the peak output of the photomultiplier for a particular X sweep of the directed beam 35. However, the data would be invalid if the surface 12 was not in range. That is, if the surface 12 is in a position wherein the photomultiplier 50 will not be able to "see" the image of beam 35 at any part during its X sweep, the location data will be invalid. To guard against this possibility, the magnitude data may be compared against a threshold value. If the magnitude data is below the threshold, the CPU (not shown) connected to the RAM pages 260A and 260B may properly indicate that the data is invalid.

Although the operation of the circuitry for the second sweep 56S2 is essentially identical to that for the sweep 1, the explanation of operation for a level different than level 1 is best illustrated graphically in FIG. 3 with reference to the counter output and photomultiplier (PM) output for sweep 3 (56S3). As the beam 35 sweeps between 60LL and 60LR, the counter 212 will again count between 0 and 255. The photomultiplier will output a peak 62L corresponding to a counter output of 63 and a time of $t_{h2}$. It should be noted that the time has been reset to 0 corresponding to the resetting of counter 212. Accordingly, as the beam 35 sweeps across level 2 it will cause the location latch 220 to output an image location output corresponding to the photomultiplier "seeing" the image of beam 35 at point 58L. Knowing the angle of the beam 35 and its reflected beam 37, optical triangulation readily yields the height provided that the magnitude data indicates that the surface 12 is within range (i.e., the image of beam 35 is "seen" by photomultiplier 50 at least one place during a particular sweep).

The angle of the beam 35 as viewed along the Y axis (i.e., the view of FIG. 3) with respect to the diffuse reflected beam 37 is determined by X scanner 16 dependent on the digital scan drive signal output by counter 212. As the image location output of latch 220 is obtained by latching to a value of counter 212, this output will correspond to the angle of beam 35 upon the detection of a peak.

Considering that the X dimension is held constant (refer to view stripe 58 of FIG. 2), the system 10 will repeatedly store Z-values for different Y-values, the different Y-values corresponding to different of the sweeps such as sweeps 56S1, 56S2, and 56S3.

The operation of the simplified version of FIG. 4 is essentially identical to that of FIG. 1 except that there is no Y deflection generator and scanning-descanning operation.

Although the scan-descan sequence is not per se new, its application to the present invention is highly advantageous. Specifically, it allows the use of the small aperture 48 which greatly reduces the sensitivity of the detector to background light. At any one time, the photomultiplier is viewing only a small circular region on the surface rather than a stripe as would be the case with use of an extended slit. Another quite important advantage of the scan-descan sequence in the present invention is that it reduces the sensitivity of the system to multiply scattered light. Many current profilers, such as TV profilers have the tendency to give false profile information when observing a groove because light scatters off one side of the groove to the other side and it comes back most strongly to the camera from the position of second scattering. The present system does not observe this multiple scattering from a wrong Y-position because the aperture stops multiply scattered light from reaching the sensor or photomultiplier 50.

If desired, the present system may be used for controlling a welding or other robotics tool. In such a situation, the system 10 or 110 could include a feedback arrangement to maintain the height of surface 12 or 112 (range between the surface and optical head 30 or 130) constant. That is, a deviation of the range between the optical head 30 or 130 and the surface 12 or 112 may be used to move the optical head and/or the surface such that the distance between them is maintained constant. The optical heads 30 and 130 may be movable to profile different portions of a surface.

If desired, additional rejection of background light may be provided by use of amplitude modulation in the laser beam applied to the surface, this anti-noise feature discussed in detail in the above-noted incorporated by reference Penney patent application. Likewise, the use of an automatic gain control type of circuit to vary the intensity of the beam to compensate for changes in the surface directional reflectivity as described in the Penney patent application could be used with the present invention.

Although specific constructions have been described herein in detail, it is to be understood that these are for illustrative purposes only. Various modifications and adaptations which fall within the true spirit of the invention will be apparent to those of ordinary skill in the art. Accordingly, reference to the claims appended hereto should be made to determine the full scope of the invention.

What is claimed is:

1. A system for determining profile information from a surface of an object comprising:
   (a) an optical beam source for generating an optical beam for application to the surface;

(b) an X-scanner operable under the control of a scan drive signal with reference marks to sweep said beam across the surface in an X direction;

(c) a sensor adapted to sense reflected optical energy corresponding to an image of said beam reflected from the surface, said sensor having a sensor output;

(d) an optical shield generally shielding said sensor and having an aperture through which the reflected optical energy may pass; and (e) a subsystem for measuring and control and connected to said sensor and to said X-scanner, said subsystem having a location storage circuit adapted to receive a location input indicative of the current location of said beam and to receive a store input dependent on said sensor output, said store input causing said location storage circuit to store its location input when the image of said beam at said optical shield becomes centered on said aperture, and wherein said image location output is indicative of profile information of said surface.

2. The system of claim 1 wherein said aperture is the only aperture in said optical shield through which the reflected optical energy may pass and said image location output is indicative of surface height.

3. The system of claim 2 wherein said location storage circuit is a location latch and its location input is said scan drive signal.

4. The system of claim 3 wherein said subsystem has a peak detector operable to detect the peak of said sensor output for each sweep of said beam and to output a peak detected signal to said store input.

5. The system of claim 2 wherein said location storage circuit supplies a single image location output for each sweep of said beam.

6. The system of claim 1 further comprising a Y-scanner operable to scan said beam across said surface in a Y direction.

7. The system of claim 6 wherein said aperture is the only aperture in said optical shield through which the reflected optical energy may pass and said image location output is indicative of surface height.

8. The system of claim 7 wherein said Y-scanner is a scanning-descanning means operable to provide a descanned optical output based on reflected optical energy of said beam on the surface and independent of Y direction variations in said beam.

9. The system of claim 8 wherein said aperture is a hole smaller than 500 microns across.

10. The system of claim 8 wherein said sensor is the only sensor used for sensing the reflected optical energy.

11. A system for determining profile information from a surface of an object comprising:

(a) an optical beam source for generating an optical beam for application to the surface;

(b) an X-scanner operable under the control of a drive signal with reference marks to sweep said beam across the surface in an X-direction;

(c) a sensor adapted to sense reflected optical energy corresponding to an image from said beam reflected from the surface, said sensor having a sensor output;

(d) an optical shield generally shielding said sensor and having a single aperture through which the reflected optical energy may pass; and (e) a subsystem for measuring and control and connected to said sensor and to said scanner, said subsystem having a location storage circuit adapted to receive a location input indicative of the current location of said beam and to receive a store input signal dependent on said sensor output, said store input causing said location storage circuit to store its location input, said location storage circuit supplying an image location output corresponding to the beam position upon the appearance of said beam image through said aperture, and wherein said image location output is indicative of the height of said surface.

12. The system of claim 11 wherein said image location output corresponds to the time interval between one of the reference marks of said scan drive signal and the appearance of said beam image through said aperture.

13. The system of claim 11 wherein said subsystem supplies a single image location output for each sweep of said beam.

14. The system of claim 11 wherein said location input of said location storage circuit is said scan drive signal.

15. The system of claim 11 wherein said subsystem has a peak detector operable to detect the peak of said sensor output for each sweep of said beam and to output a peak detected signal to said store input.

16. The system of claim 15 wherein said location storage circuit is a location latch and its location input is said scan drive signal.

17. The system of claim 11 further comprising a Y-scanner operable to scan said beam across said surface in a Y direction.

18. The system of claim 17 wherein said Y-scanner is a scanning-descanning means operable to provide a descanned optical output based on reflected optical energy of said beam on the surface and independent of Y-direction.

19. A method of determining profile information from a surface, the steps comprising:

(a) generating an optical beam for application to the surface;

(b) scanning said beam under the control of a scan drive signal with reference marks to sweep said beam in an X direction across the surface;

(c) sensing reflected optical energy corresponding to an image of said beam reflected from the surface, the reflected optical energy having passed through an aperture in an optical shield prior to its sensing; and (d) generating an image location output corresponding to the appearance of said beam image at said aperture, said image location output being indicative of profile information of said surface.

20. The method of claim 19 further comprising the step of detecting the peak of the sensed reflected optical energy for each sweep of said beam.

21. The method of claim 19 wherein a single image location output is generated for each sweep of said beam.

22. The method of claim 19 wherein said image location output is generated by: supplying a location storage circuit with a location input indicative of the current location of said beam and with a store input dependent on the sensed reflected optical energy.

23. The method of claim 22 further comprising the step of storing the magnitude of the sensed beam image.

24. The method of claim 19 further comprising the step of scanning said beam in a Y direction across the surface, said Y direction being perpendicular to said X direction.

25. The method of claim 24 further comprising the step of descanning reflected optical energy of said beam on said surface to provide a descanned optical output independent of Y direction variations in said beam.

* * * * *